United States Patent [19]
Boscaino

[11] 3,776,292
[45] Dec. 4, 1973

[54] AUXILIARY TREAD FOR TRACTION TIRE

[76] Inventor: Lorenzo Boscaino, 1 Chestnut St., Norristown, Pa. 19401

[22] Filed: Jan. 19, 1972

[21] Appl. No.: 218,907

[52] U.S. Cl. .............................................. 152/225
[51] Int. Cl. ........................................... B60c 27/16
[58] Field of Search .................... 152/225, 239, 241

[56] References Cited
UNITED STATES PATENTS
3,530,922  12/1972  Mathews ............................ 152/225
2,931,413  4/1960  Randall .............................. 152/225
3,675,701  7/1972  Garrison ............................ 152/239
2,252,027  8/1941  Pasquarella, Jr. .................. 152/239

*Primary Examiner*—James B. Marbert
*Attorney*—Charles A. McClure et al.

[57] ABSTRACT

An auxiliary tread in superimposable boot-like form is provided for conventional pneumatic traction tires of vehicles. Its tread portion is segmented, but its conjoined flanking bead portions are not. The auxiliary tread is retained detachably in place on a tire by mounting means connected to the bead portions.

15 Claims, 10 Drawing Figures

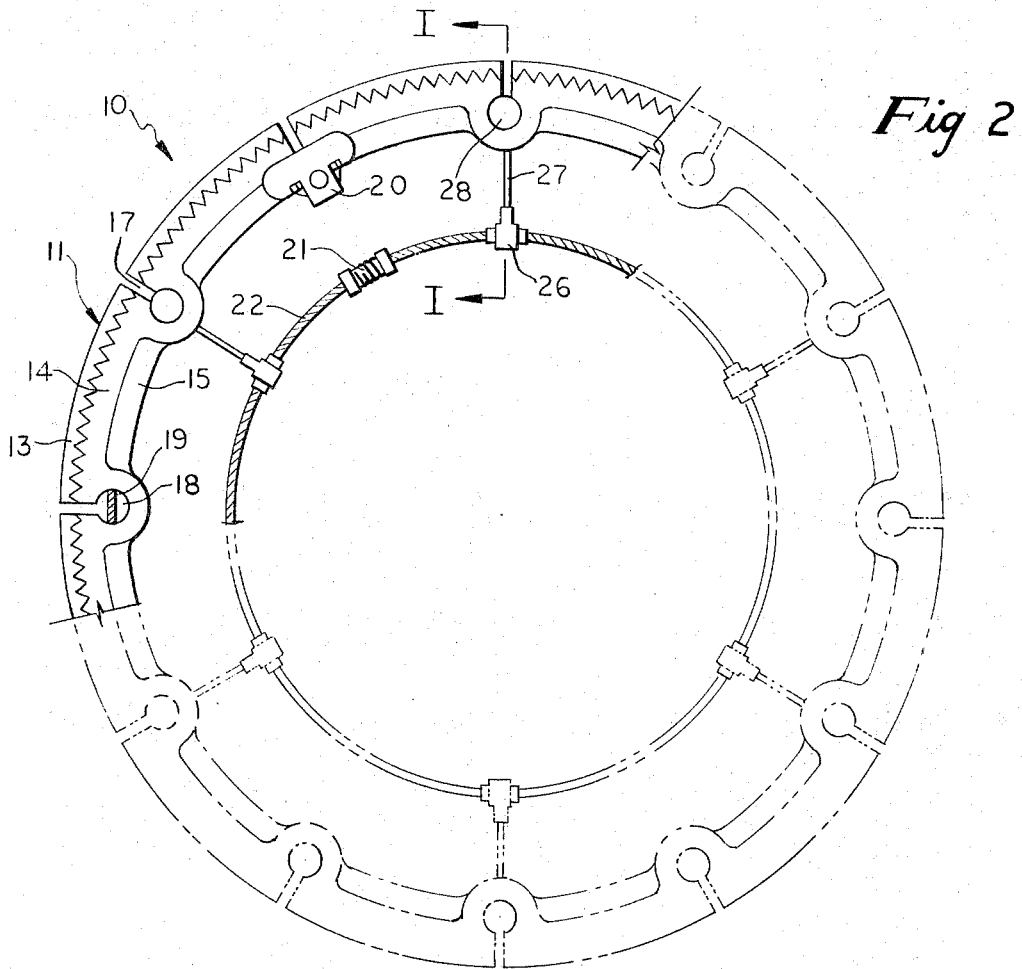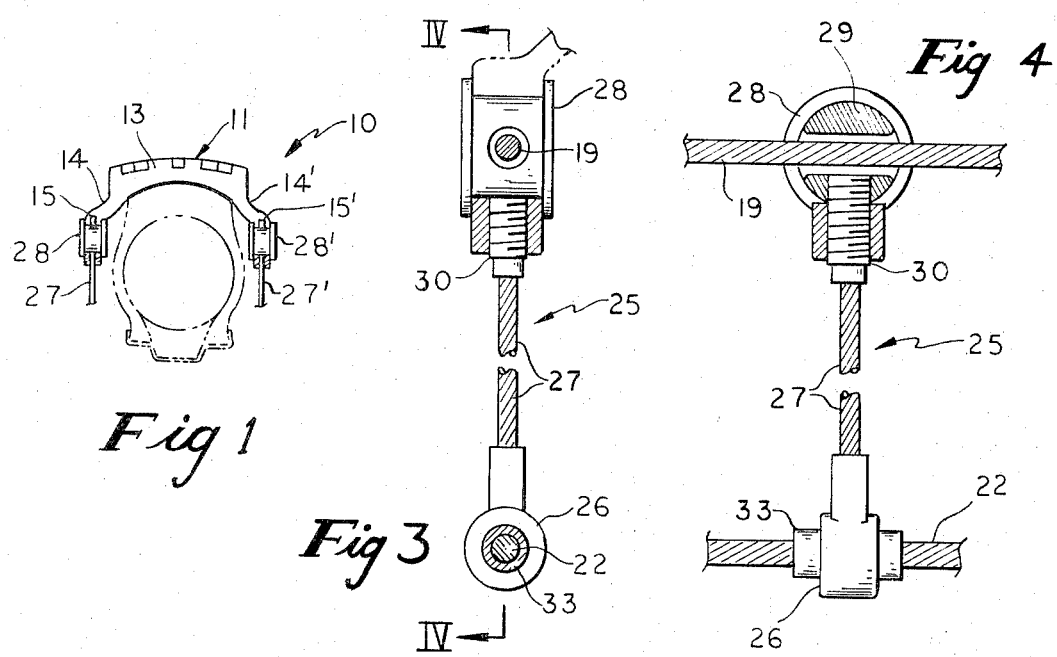

AUXILIARY TREAD FOR TRACTION TIRE

This invention relates to auxiliary tread means for use over conventional pneumatic tires to improve traction under adverse conditions of snow, mud, ice or the like.

Many anti-slip devices are known for attachment to tires of automobiles and trucks. However, they all are subject to disadvantages in construction, installation, or use.

A primary object of the present invention is provision of improved auxiliary tread means for use over conventional tires.

Another object is provision of improved mounting means for such auxiliary tread means.

A further object is more traction improvement per unit cost in auxiliary tread means for tires.

Other objects of the present invention, together with means and methods for attaining the various objects, will be apparent from the following description and the accompanying diagrams of preferred embodiments of the invention, which are given by way of example rather than limitation.

FIG. 1 is a fragmentary transverse cross-section through a first embodiment of auxiliary tread means according to this invention, taken at I—I of the next view, with a tire upon which it is mounted indicated in broken lines;

FIG. 2 is a side elevation, partly cut away, of the same embodiment of auxiliary tread means, complete with mounting means;

FIG. 3 is an enlarged view, partly in section, of a fitting of the mounting means; and FIG. 4 is a similar view taken perpendicular to FIG. 3 at IV—IV thereon.

Figure 5:
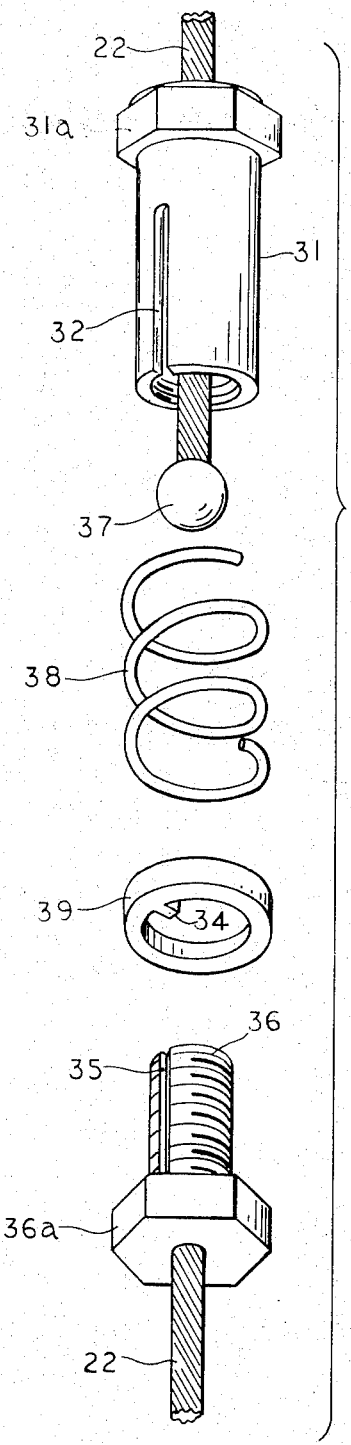
FIG. 5 is an exploded perspective view of a cable connector of the mounting means.

In general, the objects of the present invention are accomplished, in auxiliary tread means for detachable mounting about a conventional tire tread, by means of a boot-like tread piece having a medial tread portion and conjoined laterally flanking bead portions, the tread portion being segmented, and each bead portion having mounting means secured thereto at intervals therealong.

More particularly, the invention comprises such a tread piece wherein the tread portion and flanking bead portions are conjoined by intervening shallow sidewall portions, having openings at periodic intervals along the length thereof segmenting the tread portion and relieving the sidewall portions, the bead portion making up a single length continuous from one end to its opposite end, which may be either disjoined therefrom or conjoined therewith in continuous ringlike form.

FIG. 1 shows fragmentarily in transverse section, and FIG. 2 in side elevation, partly cut away, auxiliary tread means 10 as a first embodiment of this invention. It comprises tread piece 11, which has outer or tread portion 13 and pair of flanking conjoined inner or bead portions 15, 15' conjoined by shallow sidewall portions 14, 14'. The tread portion is segmented at intervals by slotlike spaces 17 extending therethrough into cylindrical opening 18 extending transversely through the sidewall and into the bead portions, together forming keyhole-shaped opening when viewed transversely as in this view.

FIG. 2 shows, as part of the mounting means, bead connector 20 and cable connecter 21, both of which appear in further detail in subsequent views. At each side (only one side visible) a bead connector secures the opposite ends of wire bead 19 together, and a cable connector secures together the ends of wire rope or cable 22 (one at each side, but only one visible here). The cable is in ring form, with a smaller radius than the minimum radius of the tread piece, and is attached thereto by radially extending linking pieces 25 spaced evenly at intervals of 60° about the circle. As shown where the tread piece is partly cut away in FIG. 1, each such linking piece has outer end 28 (28' on the opposite side) fitting about the bead wire and within the cylindrical part of one of the keyhole-shaped openings; it also has inner end 26 (26' on the opposite side) fitting about the cable, with link 27 (27' on the opposite side) interconnecting the respective ends, as shown in FIG. 2. See also the next view.

FIGS. 3 and 4 show linking pieces 25 on an enlarged scale. Outer end 28 has a sheave-like configuration with a bore extending through the walls of the hollow cylindrical part thereof to accommodate bead wire 19. Cylindrical insert 29 bored similarly is also internally threaded to receive externally threaded terminal 30 on one end of link 27. Inner end 26 of the link accommodates grommet-like sleeve 33 through which cable 22 passes.

FIG. 5 shows the parts of cable connector 21 in exploded perspective. Externally threaded terminal 36 on one end of cable 22 threads into internally threaded sleeve 31, which has a constricted opening at its far end (not visible) to retain enlarged opposite end 37 of cable 22 therein. Locking washer 39 has key portion 34 extending radially inward in position to engage longitudinally extending key slot 32 in sleeve 31 and key way 35 in terminal 36. Compression spring 38, which also fits around the sleeve, is compressed against the keyed locking washer between hex head 36a of the terminal and hex head 31a of the sleeve, thereby preventing inadvertent separation of the cable ends and resulting loosening of the tread means on the tire.

Figure 6:
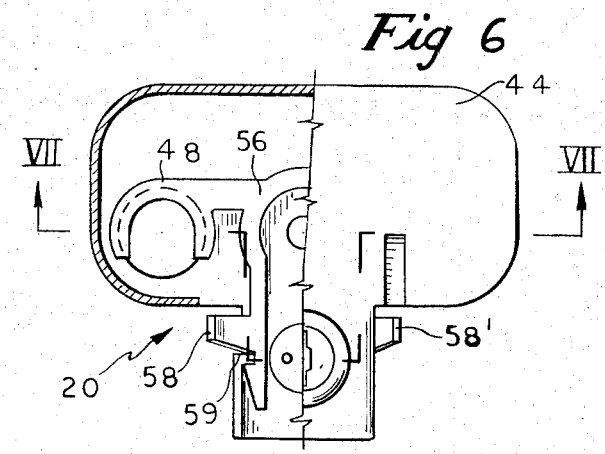
FIG. 6 is a side elevation of a bead connector of the mounting means, partly cut away.
Figure 7:
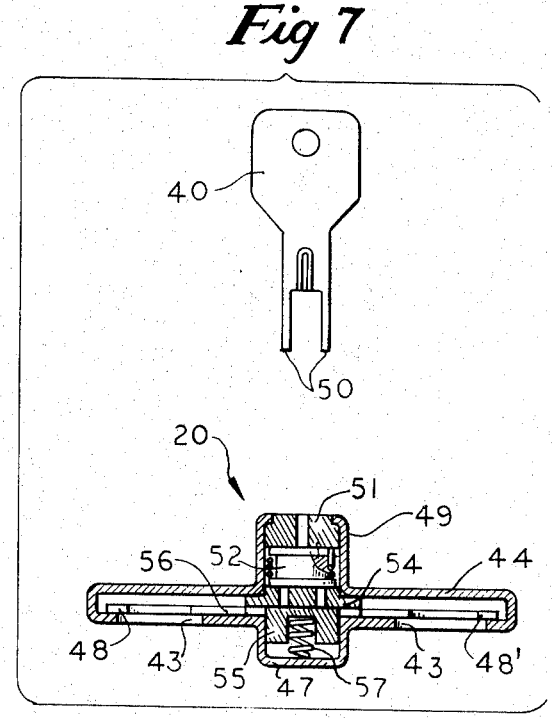
FIG. 7 is a transverse section of the connector of FIG. 6, taken at VII—VII thereon, showing also a key for operating it.
Figure 8:
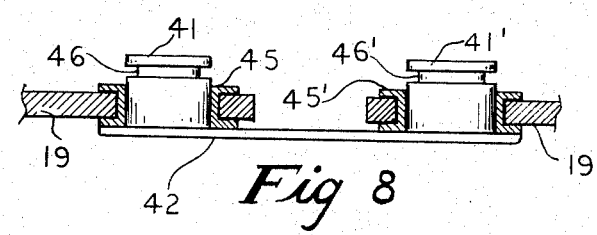
FIG. 8 is a further transverse section of part of the same connector.

FIGS. 6, 7, and 8 show various views of bead connector 20, which is of locking type using key 40 to open and close. As shown in the latter view, which is on a larger scale, plate 42 of the lock has two cylindrical bosses 41, 41' that fit into openings 43, 43' in case 44 (FIGS. 6 and 7). The opposite ends of bead 19 are retained around respective sheave-like members 45, 45' fitting about the base of the respective bosses. Cylindrical portion 47 protruding at the rear of case 44 fits closely adjacent the bosses, with the bead ends trapped therebetween with the plate so assembled to the case.

The bosses are relieved by peripheral slots 46, 46' near their free ends to receive clips 48, 48' (at the outer extremities of locking member 56), which have semicircular openings to accommodate them in the assembled position. The locking member is retained inside the case and is releasable by means of key 40. Prongs 50 of the key fit into a pair of bores (one visible) in outer cylinder 51 retained in front protruding portion 49 of the case and, when the key is turned 90° are adapted to engage inner cylinder 52, through a corresponding pair of bores in flanged member 54 to depress plunger 55 against the bias of compression spring 57. When the plunger is depressed, squeezing of pair of lungs 58, 58' on the clip member permits the clips to move sufficiently to free them from corresponding pair of detents 59 (only one visible) on the front of the case, whereupon the clip member flexes to free the clips from the bosses so that the plate may be removed to free the bead ends. Of course, with the bead ends in place the plate may be reassembled to the case, after which reclosing of the lugs and withdrawal of the key locks the plate into the case, whereupon the bead ends are retained securely in place.

Figure 10:
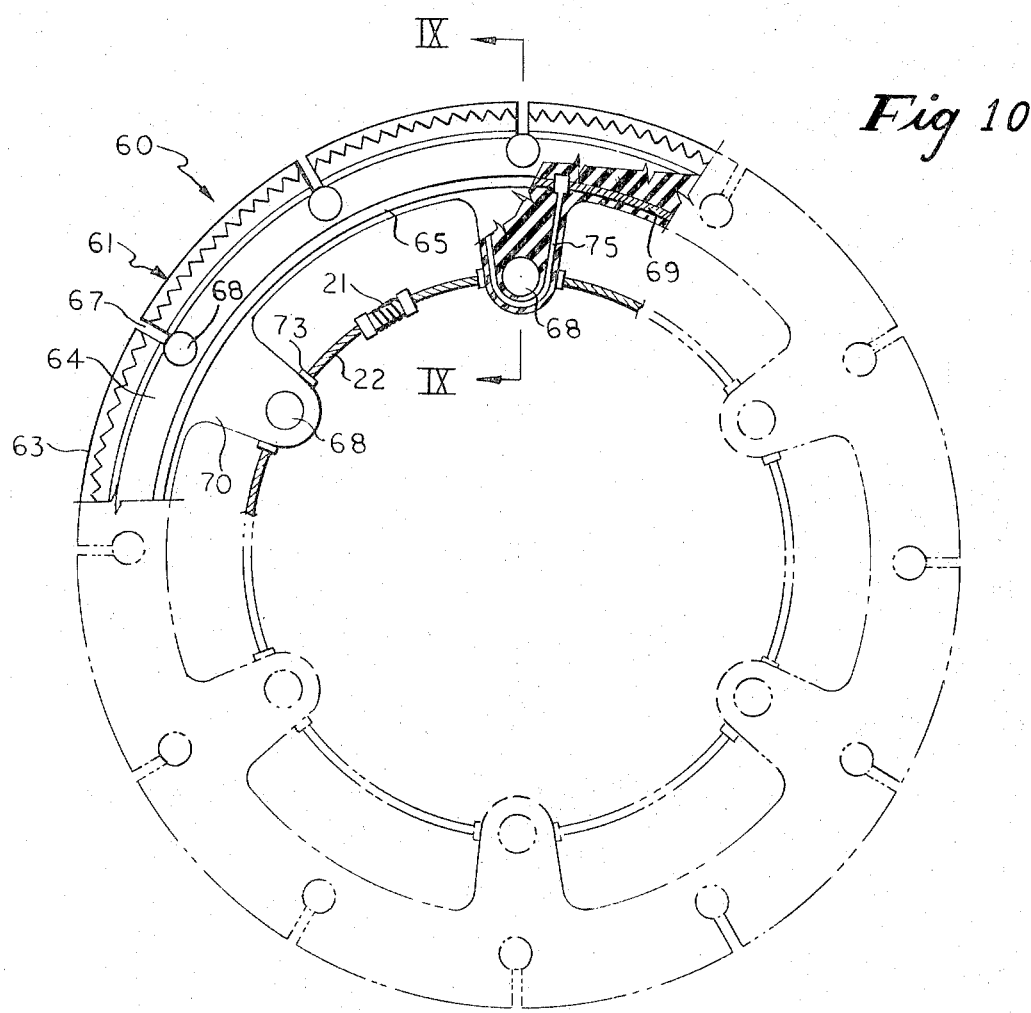
FIG. 10 is a fragmentary side elevation, partly cut away, of this second embodiment of auxiliary tread means, complete with mounting means.
Figure 9:
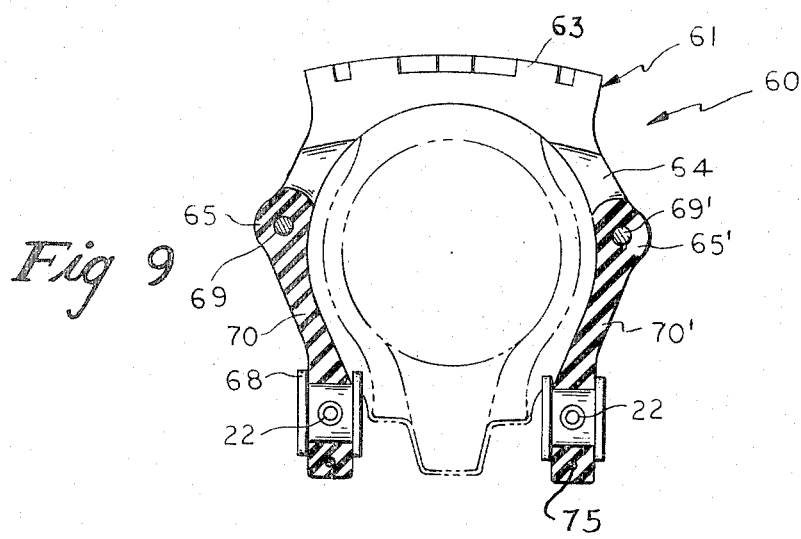
FIG. 9 is a transverse cross-section taken at IX—IX on the next view, through a second embodiment of auxiliary tread means according to this invention, with indication (in broken lines) of a tire upon which it is mounted.

FIGS. 9 and 10 show fragmentarily auxiliary tread means 60 as a second embodiment of this present invention. In the second embodiment, tread piece 61 is segmented similarly to the tread piece of the first embodiment. Keyhole-shaped openings (as viewed from the side) extend as slotlike spaces 67 through tread portion 63 and into cylindrical openings 68 in part of sidewall portion 64 thereof. Bead portions 65, 65' (with bed wires 69, 69') are in continuous ringlike form, however, and each is furnished with ears 70, 70' formed integrally therewith, which extend radially inward for attachment to respective mounting cables 22, each having cable connector 21.

FIG. 10 shows (where cut away) that each ear has U-shaped reinforcing wire 75 embedded in it, extending from encirclement by its feet about bead 69 to looping about pulley-like fitting 68 bored to accommodate the cable, the ears being molded about such fittings. Grommet-like sleeve 73 surrounds the cable within the fitting bore. Not shown in FIG. 10 is any bead connector, inasmuch as tread piece 61 preferably is made in continuous ring form (as shown) rather than as a two-ended split ring as in the first embodiment (although it may be so split, if desired).

Operation of the auxiliary tread means of this invention is readily understood. The illustrated embodiments are adapted to fit snugly over a conventional tire and to be drawn down tightly against the tire tread upon connection and adjustment of the cable connectors to shorten the effective length of the mounting cables, and are retained thereby and by locking of bead connectors when used. Mounting of the first embodiment does not require removal of the tire wheel from the vehicle because the tread piece can be flexed sufficiently to slide it over the tire tread. However, the second embodiment usually requires removal of the wheel preparatory to flexing the mounting ears sufficiently to put the tread piece in place over the tire tread. Disassembly is simply the reverse of assembly.

The segmentation of the tread and adjacent sidewall portions provides greatly improved traction, comparing very favorably with chains and conventional snow tires. However, as additional advantages, the auxiliary tread means of this invention can be run satisfactorily on dry pavement, which chains cannot, and can be removed readily, which snow tires cannot. Other benefits include low cost, great durability, and utility on tires with little freeboard relative to fenders or frame.

Although specific embodiments have been described and illustrated, modifications may be made therein, as by adding, combining, or subdividing parts, or substituting equivalents, while retaining significant advantages and benefits of this invention. It will be understood that, although the first embodiment is illustrated and described in discontinuous single-length form and the second embodiment in continuous ringlike form, the first may be made continuous and the second discontinuous, if desired, although the illustrated forms are preferred. The invention itself is defined in the following claims.

I claim:

1. In auxiliary tread means for detachable mounting about at least the tread of a conventional tire, the improvement comprising a boot-like tread piece having a medial tread portion and conjoined laterally flanking bead portions, the tread portion being segmented, and each bead portion being essentially continuous throughout all but a single minor part of the circumferential extent, having mounting means secured thereto at intervals therealong.

2. Auxiliary tread means according to claim 1, wherein the tread piece has shallow sidewalls joining the tread and bead portions, and the sidewalls are relieved by keyhole-shaped openings as viewed transversely in the vicinity of the segmentations, with the narrow part of each opening spacing adjacent segments of the tread portion and with the circular part of each opening extending into the bead portion.

3. Auxiliary tread means according to claim 2, wherein the mounting means extends into the keyhole-shaped openings and is secured to the bead thereat.

4. Auxiliary tread means according to claim 2, wherein the mounting means is secured to the bead portion in the vicinity of but spaced from the keyhole-shaped openings.

5. Auxiliary tread means for detachable mounting about the tread of a conventional tire, comprising a boot-like tread piece having a medial tread portion and flanking bead portions conjoined thereto by intervening shallow sidewall portions, having openings at periodic intervals along the length thereof segmenting the tread portion and relieving the sidewall portions, the bead portion making up a single length continuous from one end to its closely spaced opposite end, the openings being wider in the sidewall portions than in the tread portion when viewed from the side.

6. Auxiliary tread means according to claim 5, including also means for detachably securing the opposite ends of the tread piece together.

7. Auxiliary tread means according to claim 6, wherein the securing means comprises detachable means for interconnecting adjacent ends of the bead contained in such bead portions.

8. Auxiliary tread means according to claim 5, including also mounting means interconnected to the bead portions and adapted to pull the tread piece radially inward about a tire tread.

9. Auxiliary tread means according to claim 8, wherein on at least one side the mounting means comprises a plurality of fittings attached to the bead portion located in a corresponding plurality of the periodic openings.

10. Auxiliary tread means according to claim 8, wherein the mounting means includes also a cable interconnecting the plurality of mounting means, and means associated therewith adapted to interconnect adjacent ends of a bead portion and adapted also to tighten the auxiliary tread means on the tire by drawing the interconnected bead fittings radially inward from the bead portion.

11. Auxiliary tread means for detachable mounting about a conventional tire tread, comprising a boot-like tread piece having a medial tread portion and flanking bead portions conjoined by intervening shallow sidewall portions, having keyhole-shaped openings at periodic intervals along the length thereof with the narrow part of the openings segmenting the tread portion and with the circular part relieving the sidewall portions and with the narrow slot parts segmenting the tread portion, respectively, the bead portions making up a single discontinuous ringlike length, and mounting means comprising a connecting cable on each side of the tread-piece and linking pieces attached to the tread piece at periodic intervals therealong.

12. Auxiliary tread means according to claim 11, wherein the mounting means is connected to the bead portions by link fittings secured in certain of the periodic openings.

13. Auxiliary tread means according to claim 11, including ears extending radially inward from the bead portion and wherein the mounting means is connected to the ears.

14. Auxiliary tread means according to claim 11, in combination with a conventional pneumatic tire, the auxiliary tread means fitting peripherally about and in contact with the tire, each attaching cable being connected end-to-end to retain the auxiliary tread means mounted on the tire.

15. Auxiliary tread means for detachable mounting about the tread of a conventional tire, comprising a unitary striplike tread piece adapted to encircle contiguously nearly all the outermost circumferential extent of a conventional tire and including a pair of bead portions extending from one end to the opposite end along each side of the tread piece, a medial tread portion comprising a multiplicity of tread segments extending laterally between and conjoined to the bead portions and spaced apart circumferentially in segmented relationship, and means for securing the tread piece about such tire contiguously therewith.

* * * * *